Figure 1:
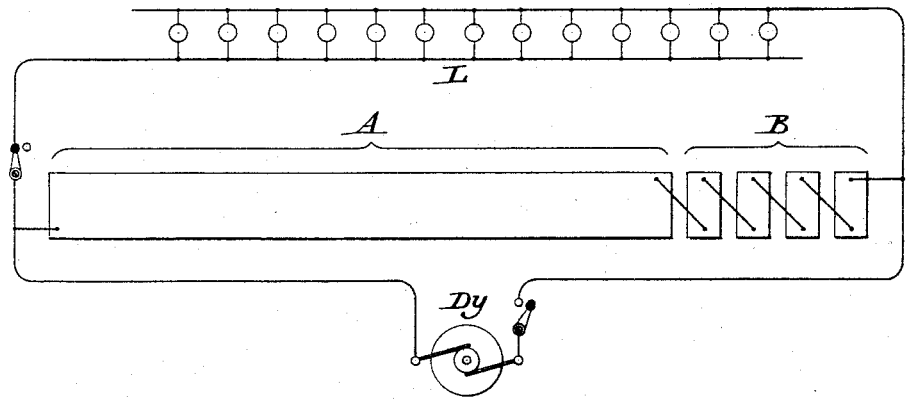

(No Model.) 3 Sheets—Sheet 1.

S. C. C. CURRIE.
REGULATION AND CONTROL OF STORAGE BATTERIES.

No. 438,145. Patented Oct. 14, 1890.

Witnesses
Geo. W. Breck
Edward Thorpe

Inventor
Stanley C. C. Currie
By his Attorneys
Baldwin, Davidson & Wight

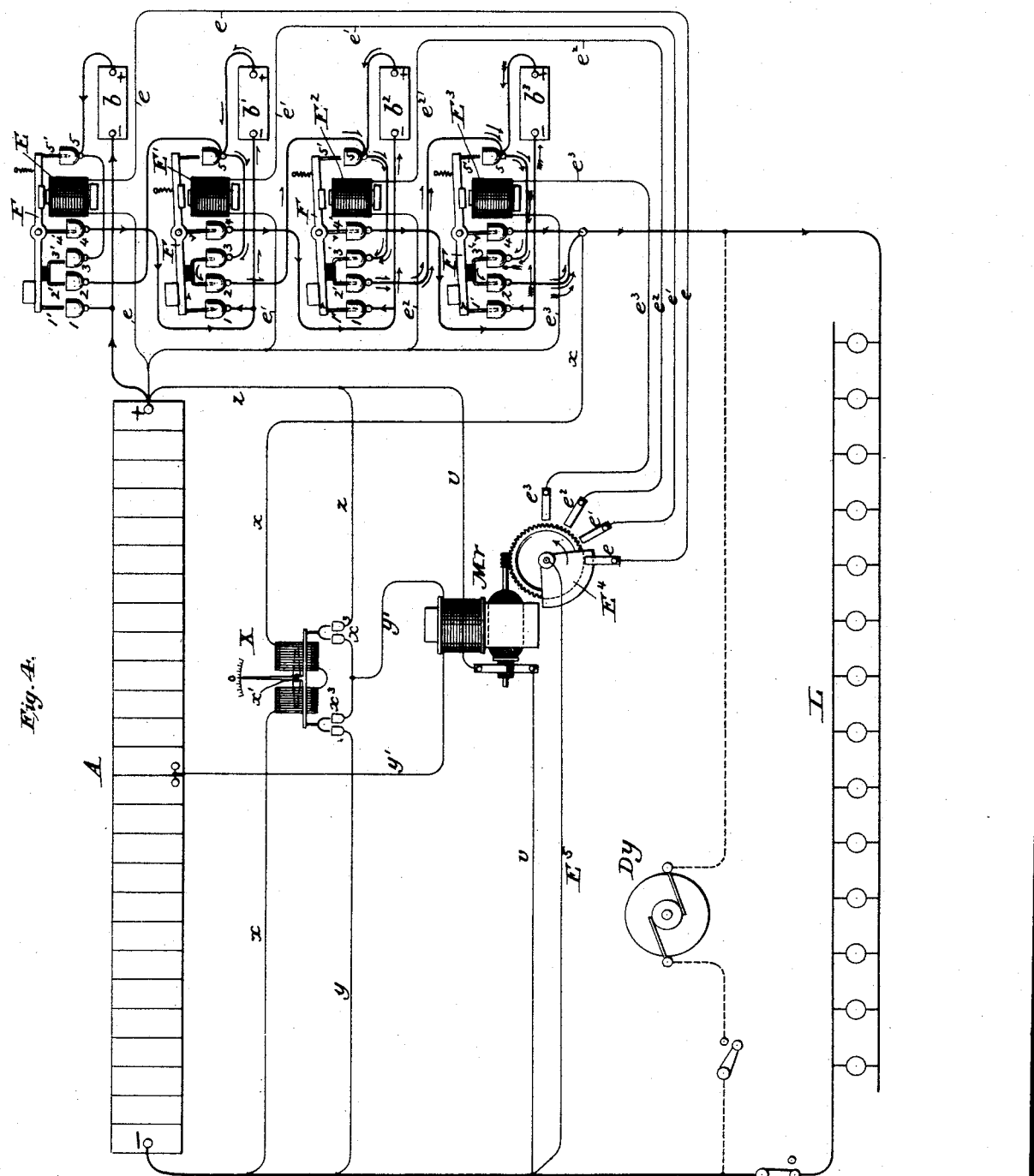

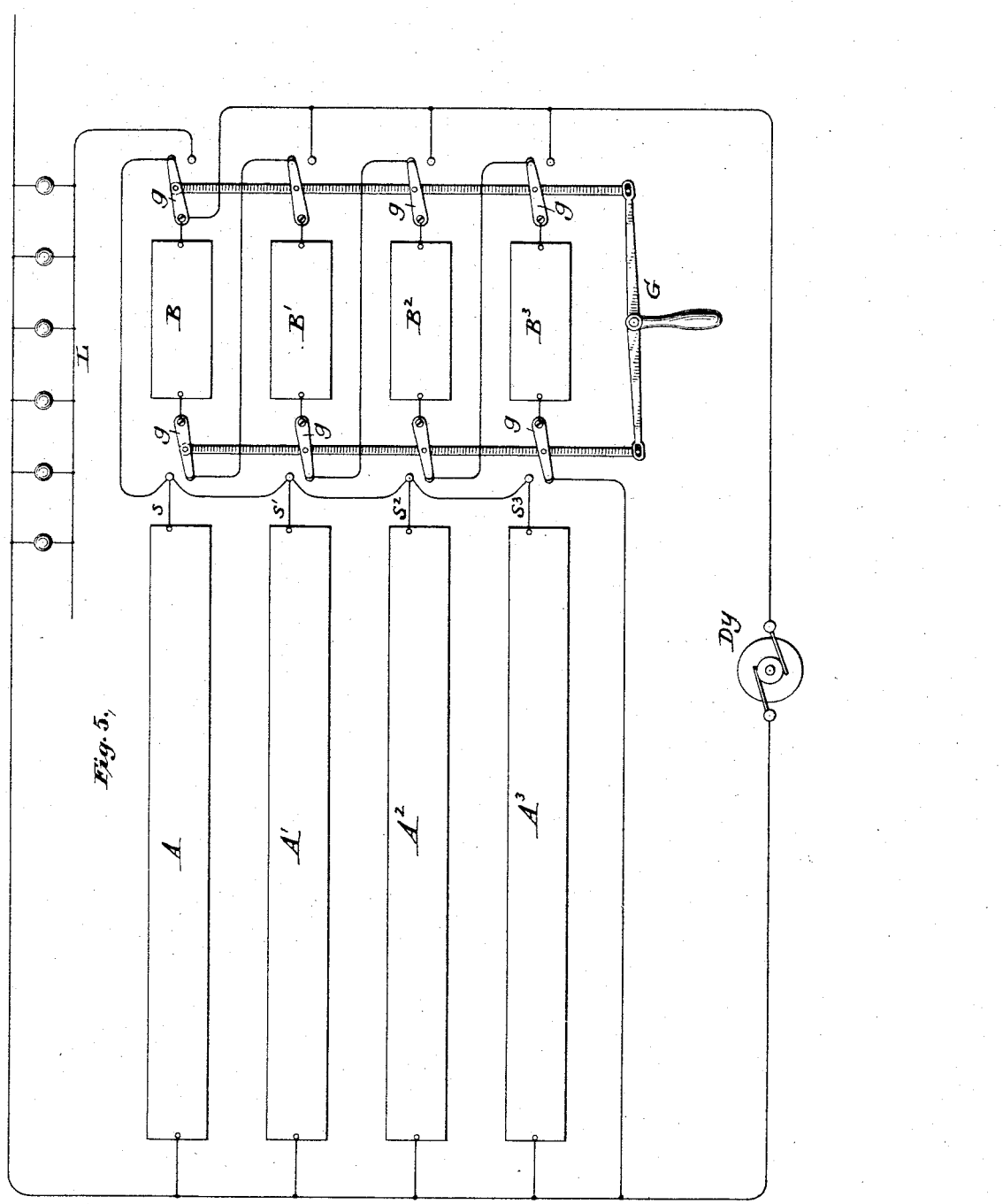

UNITED STATES PATENT OFFICE.

STANLEY C. C. CURRIE, OF PHILADELPHIA, PENNSYLVANIA, ASSIGNOR TO THE UNITED GAS IMPROVEMENT COMPANY, OF SAME PLACE.

REGULATION AND CONTROL OF STORAGE-BATTERIES.

SPECIFICATION forming part of Letters Patent No. 438,145, dated October 14, 1890.

Application filed July 30, 1890. Serial No. 360,341. (No model.)

*To all whom it may concern:*

Be it known that I, STANLEY C. C. CURRIE, a subject of the Queen of Great Britain, at present residing in Philadelphia, State of Pennsylvania, have invented certain new and useful Improvements in the Regulation and Control of Storage-Battery Systems, of which the following is a specification.

The object of my invention is to provide a simple and reliable means whereby the potential of a system of storage-batteries may be maintained constant when the output of current is variable according to the requirement of the working-circuit.

Heretofore it has been customary in operating a set of accumulators or storage-batteries to regulate the potential either by inserting a variable resistance in the circuit or by switching additional cells in and out of circuit.

My invention relates to the latter method of regulation. Ordinarily more or less trouble is experienced with the plan last mentioned in consequence of the unequal amount of current taken from the cells that are switched in and out for regulation. In my invention such cells are to be equally discharged and require, therefore, an equal amount of charging, and there will be less waste of energy, because the cells will not have to be charged at a higher potential than the potential of discharge. Generally speaking, I employ a battery of accumulators coupled in series in the usual way, and in addition thereto a number of auxiliary regulating-cells that I manipulate in the manner hereinafter described. For instance, if I am working a circuit of one hundred and ten volts I use a fixed battery of, say, fifty-two cells coupled in series and in addition thereto any desired number of auxiliary or regulating cells—say twelve—making in all sixty-four cells, and allowing for a variation of about twenty-four volts. The auxiliary cells are so manipulated, as hereinafter described, that any number of them may be thrown into series with the main battery, while the others are in parallel with each other—that is, the auxiliary cells, being normally in parallel with each other and in circuit with the main battery of accumulators, may all be thrown in series with the main battery and with each other, or one or more may be connected in series with the main battery while the remainder are in parallel with each other. By preference those cells in the series of auxiliary cells that are nearest the main-battery series are first thrown into series with the main battery, as required, while the others or those nearest the top or extreme end of the entire series of cells are in parallel and are the last to be thrown into series with the fixed or main battery of accumulators.

In addition to the means for accomplishing the necessary switching of the auxiliary cells, and which switching may be either automatic or done by hand, I have devised certain arrangements of circuits and switching mechanism by which one or more batteries of accumulators and their corresponding series of auxiliary cells may be charged and equalized.

Figure 2:
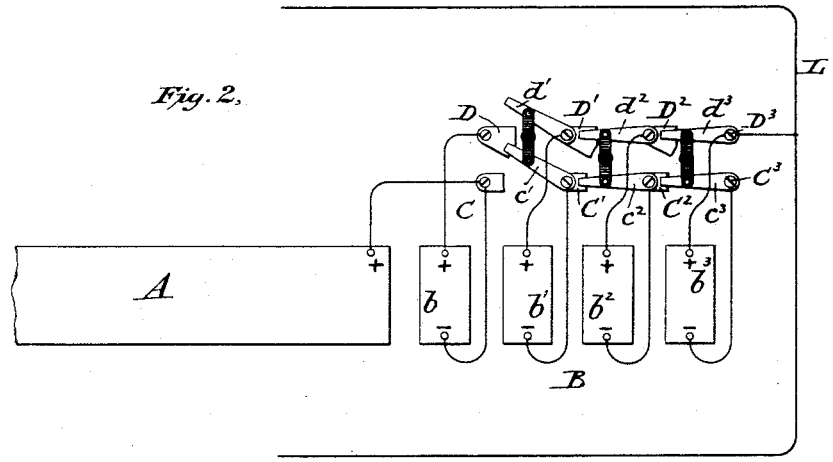
Figure 3:
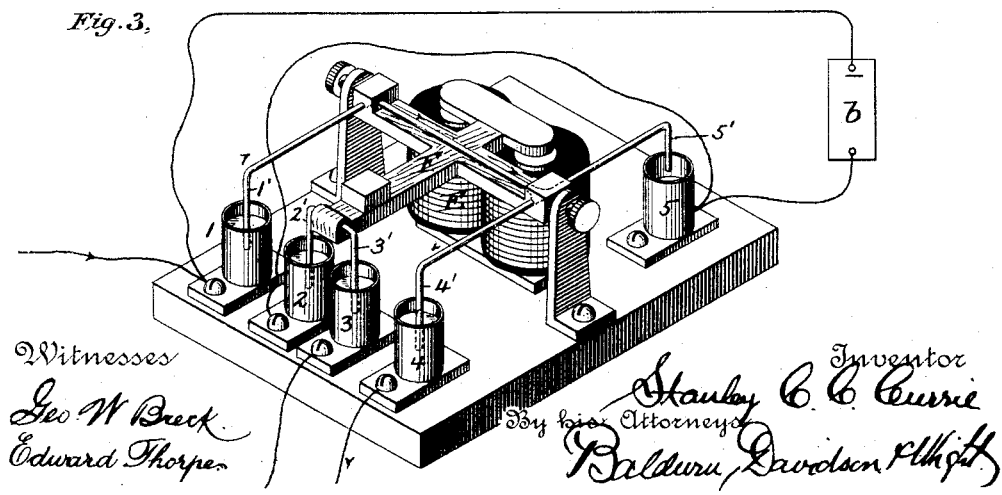

In the accompanying drawings, Figure 1 is a diagram showing a fixed battery of accumulators, series of auxiliary cells, a dynamo and circuit for charging the same, a work-circuit, and translating devices connected therein. Fig. 2 is a diagram indicating a fixed battery of accumulators, a series of auxiliary cells, and switch devices to be operated by hand to connect the auxiliary batteries each in series with the main battery or in parallel with each other. Fig. 3 is a perspective view showing an automatic electro-magnetic switch and the auxiliary cell controlled thereby for accomplishing the same purpose; Fig. 4, a diagrammatic view indicating a complete organization with automatic switches, &c.; and Fig. 5, a diagram showing an arrangement by which a series of fixed batteries of accumulators, each with its set of auxiliary cells, may be in parallel with a dynamo or lamp circuit, and the entire series or sets of auxiliary cells then connected in series with each other, the said series being in multiple with the fixed sets and also with the dynamo.

In Fig. 5, A A' A² A³ indicate the fixed series of accumulators, and B B' B² B³ the corresponding sets of auxiliary cells.

In Fig. 1 the auxiliary cells B are shown connected all in series with the main battery and supplying current to a work-circuit L, the circuit of a charging-dynamo D$y$ being shown open.

In Fig. 2 four auxiliary cells $b$ $b'$ $b^2$ $b^3$ are shown in connection with their fixed battery of accumulators A. The first cell $b$ is thrown into series with the fixed battery, while the others are in parallel with each other, the hand switching devices being as follows: The + pole of the fixed battery A is connected to a contact-plate C, with which the − pole of the cell or battery is also connected. The + pole of the cell $b$ is connected with the contact-plate D. In like manner the + pole of the battery $b'$ is connected with the contact-plate D', its − pole with the contact-plate C'. The pairs of contacts C D C' D', &c., are shown in the drawings arranged in different vertical lines. The contacts C' D' have pivoted thereon, respectively, switch-arms $c'$ $d'$, that move in parallel, being connected by cross-handle of insulating material, as usual. Similar switch-arms $c^2$ $d^2$ are pivoted upon the contact $C^2$ $D^2$, with which the poles of the auxiliary cell $b^2$ are connected, and the poles of the auxiliary cell $b^3$ are similarly connected to the heels marked $C^3$ $D^3$ of like switch-arms $c^3$ $d^3$. The heel of the switch $D^3$ is connected with the work-circuit L. When the switches $c'$ $d'$ are down, they make contact, respectively, with the contacts C D, and when thrown up, as shown in the drawings, the arm $c'$ is in contact with the plate D and the arm $d'$ disconnected therefrom. The other sets of switch-arms make similar connection. As is obvious in the drawings, when the switch-arms are all turned down the auxiliary cells $b$ $b'$ $b^2$ $b^3$ are in parallel with each other. In the drawings the first pair of switch-arms $c'$ $d'$ is thrown up, thereby placing the first cell $b$ in series with the main battery A and leaving all the other auxiliary cells in parallel with each other. By throwing up the second pair of switch-arms the second auxiliary cell $b'$ is put into series with the main battery and first auxiliary cell, while the other auxiliary cells are in parallel.

Referring to the more complete diagram, I have shown, as before, a fixed battery A of accumulators and four auxiliary cells $b$ $b'$ $b^2$ $b^3$. These cells are each controlled by electro-magnet E E' $E^2$ $E^3$, the armature-levers F of which control the switch-contacts. Each electro-magnet is in a branch circuit $e$ $e'$ $e^2$ $e^3$, running from the + pole of the main battery A to contacts swept or traversed by a switch-plate $E^4$, actuated in either direction by a motor M$r$, and connected by wire $E^5$ to the opposite or − pole of the battery A. An automatic switch or indicator X of any suitable construction has its coils connected in a circuit $x$ between the − pole of the battery and the main circuit, it being shown connected to the main circuit outside of the last auxiliary cell. The spindle $x'$ of this device carries a cross-arm, at each end of which is a bifurcated contact-arm, whose branches dip into mercury-cups $x^3$. If the index-finger of the indicator X deviates materially from the zero-mark in either direction, a circuit from the main battery through the field of the motor M$r$ will be completed. If it moves to the left, as indicated in the drawings, a circuit $y$ $y'$ will be completed from the − pole of the battery through the mercury-cups $x^3$ to the middle of the battery. If the indicator device moves in the opposite direction, the circuit will be completed from the + pole of the battery by wires $z$ through the mercury-cups $x^3$ and wire $y'$ through the field of the motor to the middle of the battery; but this current being of opposite direction to that in the circuit $y$ $y'$ the motor will move in the reverse direction. The brushes of the motor are shown connected by wires $v$ with opposite poles of the main battery. If the potential of the battery A falls, one of the circuits—say $y$—is completed and the motor M$r$ rotated in a direction to bring the contact-quadrant $E^4$ into contact with the contact plate or segment of the line $e$, thus completing that circuit and operating its magnet E, which acts through the switch devices presently described to throw the auxiliary battery $b$ into series with the main battery. The continued movement of the quadrant $E^4$ in the same direction would complete the branch circuit $e'$, and its switch-magnet E' would be energized and the auxiliary battery $b'$ thrown into series. The movement of the device X in an opposite direction would, as already described, reverse the direction of the rotation of the motor and the auxiliary batteries would be one by one again connected in parallel.

The switch devices of each magnet E E', &c., and circuit-connections are as follows: Each switch device has five mercury-cups, (marked 1 2 3 4 5,) into which contact-pins 1' 2' 3' 4' 5' project. The main-circuit wire from the + pole of battery A (indicated by the arrow-head only) is connected with cup No. 1 and also with one terminal of the auxiliary battery $b$. The opposite pole of the battery $b$ is connected to cup 5 and thence to cup 3. Cup No. 2 is connected to cup 5 of the next switch, while cup No. 4 is connected by a wire indicated by the arrow-head only and constituting the main-circuit wire with cup No. 1 and with the pole of the next auxiliary battery $b'$. Similar connections are made with the contact-cups of succeeding switches. The contact-pins 1', 4', and 5' are in electrical connection with the armature F, while 2' and 3' are in connection with each other, but insulated from the armature. The parts are so related that when the magnets are not energized the pins 1' 2' 3' 4' are in contact with the mercury in their respective cups and all the auxiliary batteries will be in parallel; but when the motor has been actuated to complete the branch circuit of a magnet, the circuit $e$ of magnet E being shown so completed in the drawings, the magnet is energized, its armature attracted, and contact-pins 4' and 5' will be in contact with the mercury in their cups, while the other pins would be lifted out. As is perfectly plain from Fig. 4, auxiliary battery $b$ will then be in series with the main battery A, while the succeeding auxiliary batteries will be in parallel with each other. The circuits may be readily traced by the arrows and arrow-heads upon the drawings. The main-circuit wire, and consequently that of the auxiliary battery $b$, as it is shown in series, is indicated by the arrow-head only. The parallel circuit of the battery $b'$ is indicated by the arrow having a half-head only, while the parallel circuit of the auxiliary battery $b^2$ is indicated by the arrow with the full head and the parallel circuit of the battery $b^3$ by the feathered arrow. With the assistance of these characters the circuits may be so readily traced that it is unnecessary to specifically describe each of them.

In Fig. 3 I have shown a switch-magnet and its devices as they might be practically organized. I prefer to use mercury contacts on account of the acid spray, in the presence of which hard metallic contacts should always be avoided.

In Fig. 4 a charging-dynamo $Dy$ is shown, its connection being indicated by dotted lines and its circuit-switch being open.

In Fig. 5 I have shown an organization by which, upon the manipulation of the switch-lever G, operating a series of switch-arms $g$, connected with the poles of the sets of auxiliary batteries, a number of main batteries A A' A² A³ may each be connected in series with its respective set of batteries B B' B² B³, the pairs of batteries A B being in parallel. When the switch is swung to the left as viewed in the drawings, the circuit-connections, as above mentioned, will be completed. In the position shown in the figure the circuit of the dynamo is closed and in parallel with the batteries. The main batteries A A' A² A³ are in multiple, while the auxiliary batteries B B' B² B³ are in series with them, this arrangement being desirable for charging, and thus filling up and equalizing the auxiliary sets.

By having switches at S S' S² S³ any one or all the fixed sets can be cut out from the dynamo-circuit and the series of auxiliary sets alone charged.

It will be seen that by means of my improvement I am enabled to maintain a constant potential under varying conditions of the circuit and to accomplish this result automatically by means of auxiliary cells normally in parallel with each other and capable of being thrown one by one into series with the main battery.

I claim as my invention—

1. The combination, with a main battery A of accumulators, of an auxiliary set of accumulators, circuit-connections connecting them normally in parallel with each other and in circuit with the main battery, and switch devices whereby each auxiliary cell or battery may be connected in series with the main battery, the remainder of said auxiliary batteries remaining connected in parallel, substantially as set forth.

2. The combination of a battery A of accumulators, a series of auxiliary batteries normally connected in parallel with each other and in circuit with the main battery, and switch devices and circuit-connections for each auxiliary battery, whereby it may be connected in series with the main battery, the remainder of the auxiliary batteries remaining in parallel with each other, as described.

3. The combination of a main battery A of accumulators, a series of auxiliary batteries normally connected in parallel with each other and in circuit with the main battery, a switch-magnet for each auxiliary battery included in a local circuit, circuit-connections, and switch-contact devices whereby upon the completion of a local circuit its switch-magnet operates the switch devices to connect that particular auxiliary battery in series with the main battery.

4. The combination of a main battery A of accumulators, a series of auxiliary batteries normally connected in parallel with each other and in circuit with the main battery, a switch-magnet and its local circuit for each auxiliary battery, a current indicator or controller, as X, included in a shunt or local circuit $x$, a motor or electro-magnetic device M$r$, for successively completing or opening the circuits of the switch-magnet, circuit connections and contacts whereby when the apparatus X is actuated in one direction the motor is moved to successively complete the local circuits of the switch-magnets and when the apparatus X is moved in the opposite direction the direction of the motor is reversed to successively open the circuits of the switch-magnets, switch devices, and contacts operated by each switch-magnet, whereby when its circuit is closed its auxiliary battery is connected in series with the main battery.

5. The combination of a main battery A of accumulators, a series of auxiliary batteries normally connected in parallel with each other and in circuit with the main battery, a switch-magnet and its circuit for each auxiliary battery, switch devices and contacts actuated by the switch-magnet to connect its auxiliary battery in series with the main battery upon the completion of its local circuit, contact devices for successively closing the circuits of said switch-magnets and thereby successively connecting the auxiliary battery in series with the main battery, and means controlled by the current of the main battery for successively closing the switch-magnet circuits as the current varies.

6. The combination of the main battery A of accumulators, the auxiliary batteries normally connected in parallel and in circuit therewith, their switch contacts and devices, switch-magnets and local circuits of the magnets, contact devices controlled by an electric motor for closing the switch-magnet circuits, the circuits $y\,y'$ and $z\,y'$, running from opposite poles of the battery through the motor, a controlling device, as X, and its circuit and contact devices, whereby either the circuit $y\,y'$ or $z\,y'$ is completed to move the motor in one direction or the other, according to the requirements of the system, as described.

In testimony whereof I have hereunto subscribed my name.

STANLEY C. C. CURRIE.

Witnesses:
W. ALEX. ROBINSON,
T. H. MACMORRIS.